UNITED STATES PATENT OFFICE.

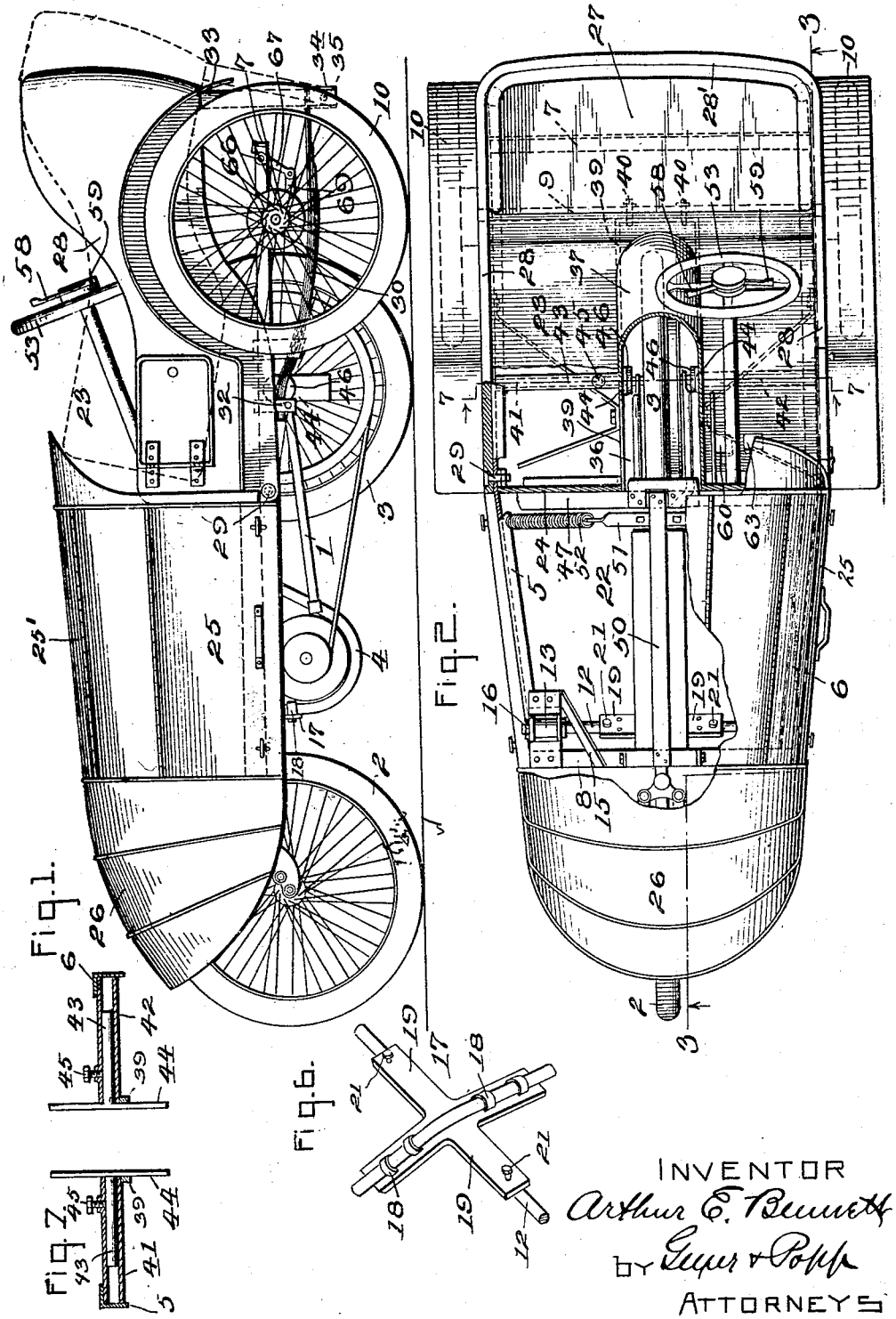

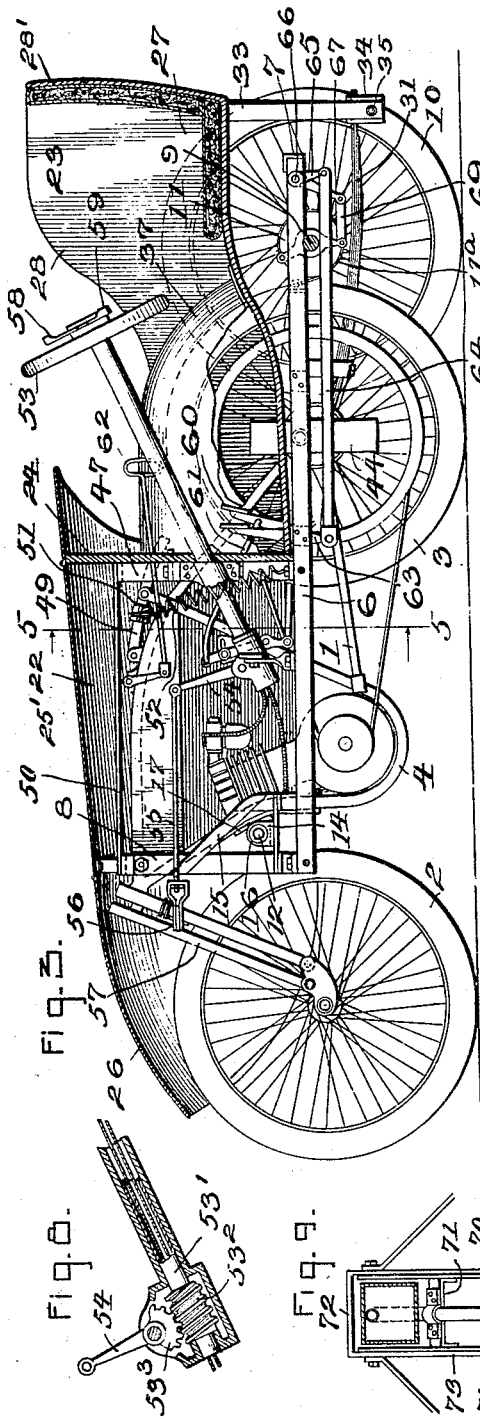

ARTHUR E. BENNETT, OF BUFFALO, NEW YORK, ASSIGNOR TO THE MOTOR CYCLE CAR CORPORATION, OF BUFFALO, NEW YORK, A CORPORATION OF NEW YORK.

CAR ATTACHMENT FOR MOTOR-CYCLES.

1,283,636.  Specification of Letters Patent.  Patented Nov. 5, 1918.

Application filed November 1, 1915. Serial No. 59,048.

*To all whom it may concern:*

Be it known that I, ARTHUR E. BENNETT, a citizen of the United States, residing at Buffalo, in the county of Erie and State of New York, have invented new and useful Improvements in Car Attachments for Motor-Cycles, of which the following is a specification.

This invention relates to a car attachment for motor and other cycles which is adapted to be detachably connected with an ordinary motor or other cycle for converting the same into an automobile or motor car or vehicle of larger capacity.
The object of my invention is to provide a wheeled body or chassis which is so constructed as to be easily attached to any motor or other cycle in such a manner as to bring the seat of the attachment directly in the rear of the motor or other cycle, the attachment being provided with a steering wheel and other controlling levers which are connected to the respective controlling devices of the motor or other cycle.
In the accompanying drawings:

Figure 1 is a side view of a motor cycle equipped with my car attachment. Fig. 2 is a top plan view of the same, partly broken away, to more clearly show the construction.
Fig. 3 is a longitudinal vertical section of the car as a whole showing the motor cycle in elevation. Fig. 4 is an end view looking from the front with the hood broken away. Fig. 5 is a transverse vertical section taken on line 5—5, Fig. 3. Fig. 6 is a detail perspective view of the clamping member for attaching the car to the motor cycle. Fig. 7 is a fragmentary transverse section on line 7—7, Fig. 2. Fig. 8 is a fragmentary longitudinal section of the steering gear. Fig. 9 shows a modified form of the clamping device for detachably connecting the car and motor cycle.

Similar characters of reference indicate corresponding parts throughout the several views.

The main frame 1 of the motor cycle is of the usual construction and is supported on the front and rear wheels 2 and 3, respectively.

The chassis or frame of the car consists of two longitudinally-extending bars 5 and 6 arranged substantially parallel to each other and connected at their rear ends by a transverse bar 7, while their front ends are connected by an arch-shaped bar or member 8, as shown in Fig. 4. The rear end of the car frame is supported on a transversely arranged dead axle 9 supported by the wheels 10, the latter being provided near opposite ends with the usual brake disks 11.

The front end of the car frame is hinged or journaled to the main frame of the motor cycle preferably in the following manner:

12 indicates a horizontal shaft arranged transversely across the front end of the frame of the car directly in rear of the arched member 8, and journaled in suitable bearings 13 and 14. These bearings are supported by the arched member 8 and by braces 15 extending vertically from the side frames 5 and 6 with their upper ends inclined forwardly and secured to the arched member 8. Nuts 16 on either end of this shaft serve to prevent lateral movement of the same and provide means whereby the shaft may be readily removed when detaching the car body from the motor cycle.

17 indicates a clamping plate secured to the lower reach bar 4 of the motor cycle frame by suitable U-shaped clips or staples 18. Wings 19 extending laterally from said clamping plate 17 are provided with clips or staples 20 adapted to receive the transverse shaft 12, securely supporting the latter from the motor cycle frame at this point. Set screws 21 at the outer ends of the wings provide ample lateral adjustment of the shaft 12 to properly center the front end of the car frame with relation to the motor cycle.

The body portion of the car is divided into two compartments or sections, viz: the hood portion 22 and the tonneau 23 separated by a vertical transverse partition 24, the latter forming a dash for the tonneau. The hood is adapted to house the upper portion of the motor cycle and is provided with side doors 25, each of which is constructed of folding sections pivotally connected with each other and with a fixed top panel 25¹, whereby the working parts of the motor cycle may be easily reached. A canopy or vizor 26 forming the front end of the hood serves as a protection for the steering wheel of the motor cycle.

The tonneau is provided with a seat 27 which is inclosed by side pieces or walls 28 extending forwardly toward the dash 24 and a back rest 28¹ connecting the rear ends of the side walls. The side pieces are fulcrumed or hinged at their front ends to the main frame of the car by bolts 29 passing horizontally through the frame and side pieces to permit of swinging these side pieces and the parts connected therewith vertically.

30, 31 indicate a pair of semi-elliptical springs secured to the underside of the side members 5 and 6 of the frame in front of the rear axle by U-shaped straps 32, said springs extending rearwardly beneath the rear axle beyond the main frame of the car. These springs are adapted to support the rear end of the tonneau, and are connected to the latter by upright posts 33 extending downwardly from the tonneau, each of these posts preferably comprising a U-shaped member open at its lower ends and adapted to receive a bearing block 34 rigidly secured to the outer or rear end of the companion spring. Each of the bearing blocks and its supporting post are pivotally connected by a horizontally arranged pin 35, which construction permits of a free vertical movement of the seat. By removing the forward bolts 29 which connect the side members of the tonneau to the main frame of the car, the tonneau may be tipped backward, as shown in dotted lines in Fig. 1, thereby rendering the rear portion of the running gear open for inspection, adjustment and repair.

The rear drive wheel of the motor cycle is not connected in any manner to the trailing car, and is capable of a free vertical movement, by means of an opening 36 provided in the floor of the tonneau which receives this wheel. A shield or cover 37 mounted on the tonneau and extending over this wheel acts to entirely inclose the latter. To prevent any lateral movement of the drive wheel of the motor cycle the following means are preferably provided:—

39 indicates a U-shaped inner frame surrounding the opening 36 having its rear end closed and secured to the rear axle 9 of the car by suitable fastenings 40, while its side members are secured at their forward ends to the partition 24. 41, 42 indicate hollow pieces of tubing arranged transversely between the inner frame and the outer frame of the car on opposite sides of the hub of the rear wheel of the motor cycle. Arranged in the inner open ends of these tubes are two adjusting rod members 43, having guide members 44 at their inner ends the faces of which are arranged parallel to the vertical travel of the rear wheel of the motor cycle. The guide members are adjusted to different widths of motor cycles by means of set screws 45 arranged in the hollow pieces of tubing and engaging the adjusting rods 43, as shown in Fig. 7. 46 indicates disks screwed or otherwise secured to the outer ends of the rear hub or axle of the motor cycle, and adapted to engage the guide members 44. A second arched member 47 is arranged transversely of the car frame directly in front of the partition 24. A vertical slot 48 formed in the top of said arched member 47 is adapted to receive the saddle bar 49 of the motor cycle to retain the motor cycle frame in a vertical position. The slot 48 is of sufficient height to allow a free vertical movement of the rear of the motor cycle. 50 indicates a bar extending horizontally between the two arched members 8 and 47 serving to strengthen the frame at this point.

To permit of a downward pressure on the rear driving wheel of the motor cycle to increase its tractive effort, a cross piece 51, as best shown in Fig. 5, is clamped to the saddle bar 49 of the motor cycle. Extending downwardly from the outer ends of the cross piece are a pair of spiral springs 52 the lower ends of which are attached to the side members of the car frame.

53 indicates a steering wheel arranged in the tonneau of the car within easy reach of the driver and mounted at the rear end of a steering shaft or rod 53$^1$. At its front end the steering shaft is provided with a worm 53$^2$ which meshes with a gear segment 53$^3$ on a lever 54, as shown in Fig. 8, so that upon turning the wheel 53 to the right or to the left the lever 54 will be moved forwardly or backwardly. This lever in turn is connected by a connecting rod 55 to a bracket 56 attached to and extending laterally from the supporting forks 57 of the front wheel of the motor cycle, the usual handle bars of the motor cycle having been previously removed.

58, 59 indicate the gas and spark controlling levers which are arranged in the usual manner on the steering wheel of the car. 60 indicates the clutch pedal which is connected by a rod 61 to the clutch mechanism of the motor cycle.

62 indicates a hand lever connected to the two speed valves of the motor. It is understood that these connections may vary in accordance with different constructions and location of the parts on the different makes of motor cycles.

63 indicates a brake pedal suitably pivoted to the flooring of the car which is connected by a connecting rod 64 to a rock arm 65 carried by a rock shaft 66 extending laterally across the rear of the car frame. Additional rock arms 67 extending downwardly from said rock shaft 66 are connected by links 69 to suitable brake bands 11$^a$ which encircle the brake drums 11 attached to the rear wheel of the car.

In Fig. 9 is shown a modified form of connecting means between the motor cycle and car frame which are constructed as follows:

70 indicates guide plates extending vertically and parallel to the lower reach bar 4 of the motor cycle frame, and clamped thereto at their upper and lower ends by suitable clamping members 71.

72 indicates a yoke having side members 73 which extend vertically in alinement with the parallel bars 70 and pivotally connected thereto on either side by a bolt 74. This yoke member in use would take the place of the arched member 8 if attached to the forward end of the main frame, in which position the said yoke would replace the pivotal shaft 12.

By this construction I have devised a car that can be readily attached to or detached from any motor cycle, and by the arrangement of the seat or tonneau the load is brought directly in the rear of the motor cycle, making a compact and simple car which permits of readily and quickly converting an ordinary motor cycle into a motor car when desired for transporting two passengers side by side, but permitting the motor cycle to be used in the ordinary manner when only one person wishes to ride the same.

This car attachment is very simple and inexpensive in construction and enables the usefulness of a motor cycle to be materially increased.

I claim as my invention:

1. A vehicle attachment for motor and other cycles comprising a wheeled frame adapted to be connected at its front end with the front part of a motor or other cycle, and means for guiding said frame on the opposite sides of the cycle so as to be free to move vertically relatively thereto but held against lateral movement relatively thereto.

2. A vehicle attachment for motor and other cycles comprising a wheeled frame adapted to be connected at its front end with the front part of a motor or other cycle, and means for guiding said frame on the opposite ends of the rear axle of said cycle so as to be free to move vertically relatively thereto but prevented from moving laterally relatively thereto.

3. A car attachment for motor and other cycles comprising a substantially U-shaped frame open at its forward end and adapted to surround a motor cycle, a horizontal supporting shaft arranged transversely across the motor cycle and attached thereto, bearings carried by said U-shaped frame adapted to receive said horizontal shaft, an axle member connected to the rear of said frame, wheels supporting said axle member, a body mounted on said frame, and controlling mechanism on said body adapted to be attached to the controlling means of said motor cycle.

4. A car attachment for motor and other cycles comprising a substantially U-shaped frame adapted to surround a motor cycle, an arched member connecting the forward end of said U-shaped frame, bearings mounted at the base of said arched member, a horizontal shaft arranged transversely of said frame and supported in said bearings and adjustably secured to said motor cycle, an axle member connected to the rear of said frame, wheels supporting said axle member, a body mounted on said frame, and controlling mechanism on said body adapted to be attached to the controlling means of said motor cycle.

5. A car attachment for motor and other cycles comprising a substantially U-shaped frame adapted to surround a motor cycle, an arched member arranged transversely of said frame and connected to the forward end thereof and adapted to bridge the motor cycle frame, bearings carried by said arched member, a horizontal shaft arranged transversely of said U-shaped frame and supported in said bearings and adjustably secured to said motor cycle frame, an axle member connected to the rear of said frame, wheels supporting said axle member, a body mounted on said frame, and controlling mechanism on said body adapted to be attached to the controlling means of said motor cycle.

6. A car attachment for motor and other cycles comprising a frame adapted to surround a motor cycle and connected thereto at its forward end, an axle member connected to the rear of said frame, wheels supporting said axle member, a body mounted on said frame, a partition interposed centrally of said body, openings in the partition and flooring of said body adapted to receive the rear driving wheel of said motor cycle, means for preventing lateral movement of said rear driving wheel with relation to the body, and controlling mechanism assembled on said body and adapted to be attached to the controlling means of said motor cycle.

7. A car attachment for motor and other cycles comprising a frame adapted to be arranged horizontally around a motor cycle and horizontally pivoted at its forward end thereto, an axle member arranged transversely across the rear of said frame and connected thereto, wheels supporting said axle member, a vertically arranged arched member connected to said frame extending transversely thereof and adapted to embrace the upper part of the motor cycle frame, an inner frame open at its front end and arranged horizontally within said outer frame and adapted to receive the rear drive wheel of the motor cycle, and means carried by said inner frame to prevent lateral movement of said rear driving wheel.

8. A car attachment for motor and other cycles comprising a frame adapted to be arranged horizontally around a motor cycle and horizontally pivoted at its forward end thereto, wheels supporting said axle member, a vertically arranged arched member connected to said frame and extending transversely thereof, the upper part of said arch terminating in a slot adapted to embrace the upper horizontal bar of said motor cycle frame, an inner frame open at its front end and arranged horizontally within said outer frame and secured thereto and adapted to receive the rear driving wheel of said motor cycle, an adjustable guideway carried by and arranged transversely of said outer and inner frame, and disks secured on either side of the hub of the rear axle of the motor cycle and adapted to engage said adjustable guideways to prevent lateral movement of said rear drive wheel.

9. A car attachment for motor and other cycles comprising a frame adapted to be arranged horizontally around a motor cycle and horizontally pivoted thereto at its forward end, an axle member arranged transversely across the rear of said frame, wheels supporting said axle member, arched members bridging the forward end of said frame, one of said arched members acting to hold the motor cycle in a vertical position, means carried by said frame to prevent lateral movement of the rear part of said motor cycle, and controlling mechanism assembled within said body and adapted to be attached to the controlling mechanism of the motor cycle.

10. A car attachment for motor and other cycles comprising a frame adapted to be arranged horizontally around a motor cycle and horizontally pivoted thereto at its forward end, an axle member arranged transversely across the rear of said frame, wheels supporting said axle member, arched members bridging the forward end of said frame, one of said arched members acting to hold the motor cycle in a vertical position, means carried by said frame to prevent lateral movement of the rear of said motor cycle, a hood portion carried by said arched members and covering said motor cycle, a tonneau pivoted at its forward end to said frame located at the rear of said hood portion, and springs interposed between the rear of the car frame and the rear portion of said tonneau.

11. A car attachment for motor and other cycles comprising a frame arranged horizontally around said motor cycle and horizontally pivoted thereto at its forward end, an axle member arranged transversely across the rear of said frame, wheels supporting said axle member, arched members bridging the forward end of said frame, one of said arched members acting to hold the motor cycle in a vertical position, means carried by said frame to prevent lateral movement of the rear of said motor cycle, a hood portion carried by said arched members encircling said motor cycle, a tonneau pivoted at its forward end to said frame located at the rear of said hood portion, and spring members secured to either side of the main frame and extending rearwardly therefrom beyond the main frame and connected at their outer ends to the rear of the tonneau.

12. A car attachment for motor and other cycles comprising a frame adapted to be arranged horizontally around a motor cycle and horizontally pivoted thereto at its forward end, an axle member arranged transversely across the rear of said frame, wheels supporting said axle member, arched members bridging the forward end of said frame, one of said arched members acting to hold the motor cycle in a vertical position, means carried by said frame to prevent lateral movement of the rear part of said motor cycle, a hood portion carried by said arched members and covering said motor cycle, a tonneau pivoted at its forward end to said frame located at the rear of said hood portion, and spring members secured to either side of the main frame forward of its rear axle and extending rearwardly therefrom and pivotally connected to the rear of the tonneau.

ARTHUR E. BENNETT.

Copies of this patent may be obtained for five cents each, by addressing the "Commissioner of Patents, Washington, D. C."